May 12, 1942.  J. H. CANNON  2,282,454

ELECTRIC CIRCUIT CONTROL

Filed Aug. 2, 1940  2 Sheets-Sheet 1

INVENTOR
JAMES H. CANNON
BY
HARRIS, KIECH, FOSTER & HARRIS

FOR THE FIRM

ATTORNEYS

May 12, 1942.  J. H. CANNON  2,282,454
ELECTRIC CIRCUIT CONTROL
Filed Aug. 2, 1940   2 Sheets-Sheet 2
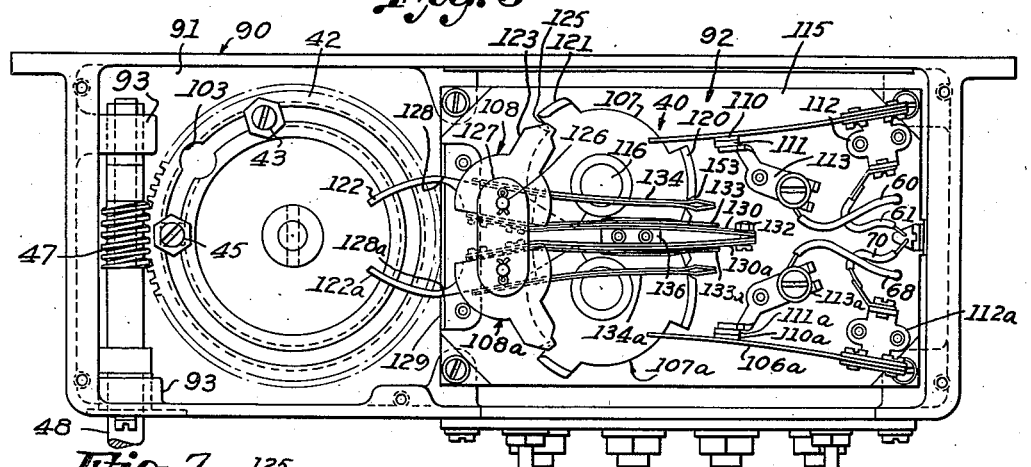
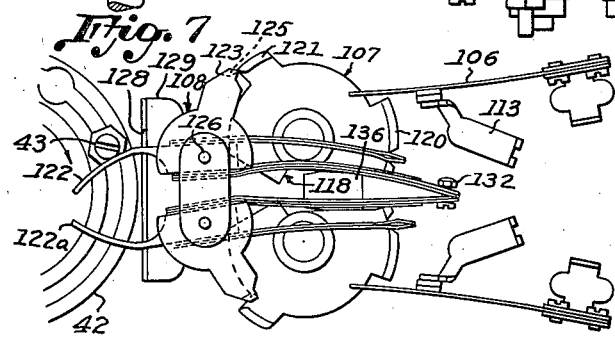
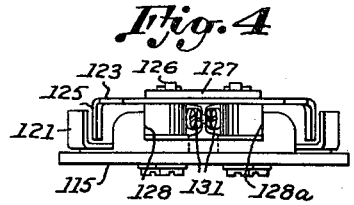
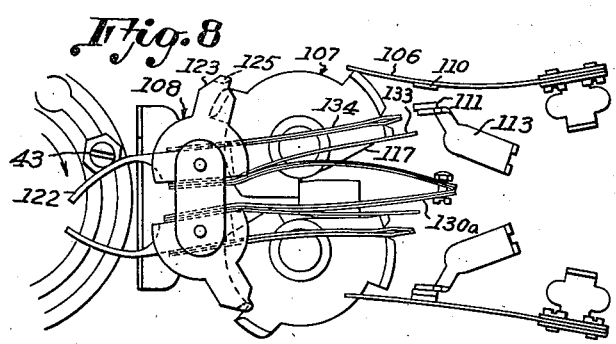
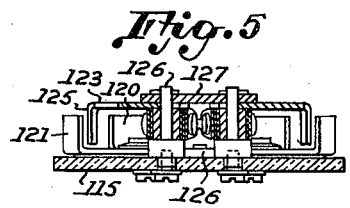
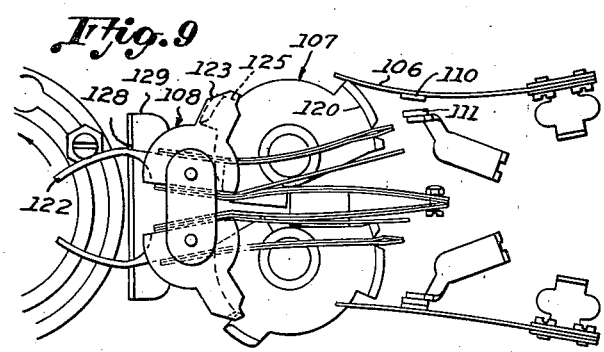
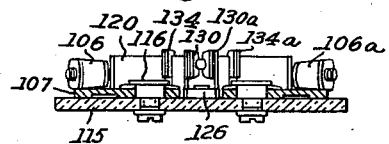
INVENTOR
JAMES H. CANNON
BY HARRIS, KIECH, FOSTER & HARRIS
FOR THE FIRM
ATTORNEYS Patented May 12, 1942

2,282,454

UNITED STATES PATENT OFFICE 2,282,454

ELECTRIC CIRCUIT CONTROL

James H. Cannon, Los Angeles, Calif.

Application August 2, 1940, Serial No. 350,012

8 Claims. (Cl. 200—47)

My invention relates to means for controlling electric circuits with special reference to control systems that include limit switches for stopping electrically driven devices.

While my invention is applicable widely to control systems and may be used for diverse purposes in such systems, it is being initially embodied in a system for controlling electrically-actuated landing gears for aircraft. It is deemed sufficient for the purpose of disclosure and illustration to limit the present description to such an embodiment, since those skilled in the art will find adequate guidance therein for applying the invention wherever it may have utility.

The general object of my invention is to provide an effective and reliable circuit control to meet the exacting requirements of systems for actuating landing gears and of other systems presenting similar problems.

Control systems of the character to which the present invention pertains are characterized by the employment of a limit switch to open a motor circuit when a driven member reaches a limit position. One of the problems commonly encountered in such systems arises from the fact that a tendency for the driven member to retreat from a limit position may result in frequent closing of the limit switch. For example, in a system for the remote control of aircraft landing gear in which the landing gear is retracted in opposition to gravity, the landing gear tends to creep downward from retracted position and if the limit switch is sensitive the tendency may cause "chattering," the limit switch remaining open only momentarily after each automatic energization of the motor circuit to check the creepage. One object of my invention is to provide a control arrangement in which repeated energization of the motor circuit to combat such creepage is relatively infrequent.

Other objects of my invention pertain specifically to the construction of a limit switch and associated elements in such a control system. One object here is to provide an efficient form of switch to operate with snap-action. Another object is to provide a limit switch that not only operates with a snap-action, but will also operate with delayed action, at least in its closing movement, whereby substantial initial movement of a driven member away from the limit position may occur without causing the limit switch to close.

Other objects and advantages of the preferred form of my invention, especially with reference to the specific structure of the limit switch, will be understood from the following description considered with the accompanying drawings.

In the drawings, which are to be taken as illustrative only:

Fig. 3 is a plan view of the structure shown in Fig. 2;

Figure 2:
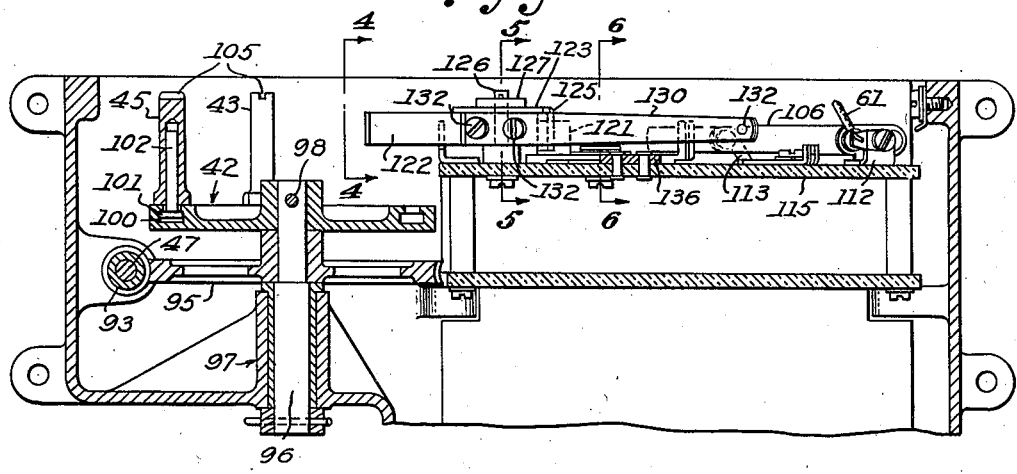
Fig. 2 is a longitudinal section through a portion of a casing and mechanism therein employed in the preferred form of my invention, the casing cover being removed.

Figs. 4, 5, and 6 are transverse sections taken as indicated by the lines 4—4, 5—5, and 6—6 of Fig. 2;

Fig. 7 is a plan view of selected elements in Fig. 3 showing the initial stage of the opening action of a limit switch as the landing gear approaches one of its alternate limit positions;

Fig. 8 is a similar view showing the completion of the opening action of the limit switch begun in Fig. 7; and Fig. 9 is a similar view showing the initial stage of the closing action of the limit switch as the driven member moves away from one of its limit positions.

Figure 1:
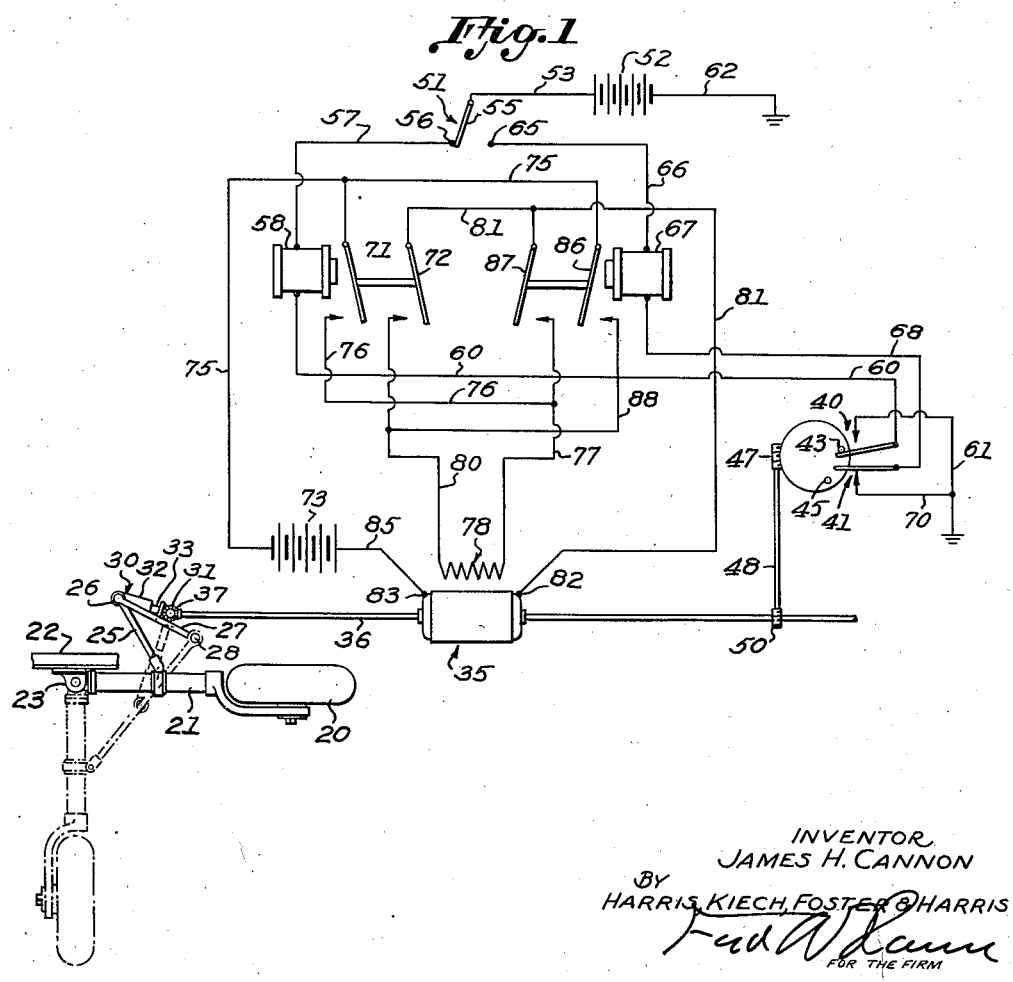
Fig. 1 is a schematic presentation of a preferred form of my invention, including a wiring diagram.

Fig. 1 indicates diagrammatically the structure of one type of retractable landing gear for an aircraft. Each of the landing wheels 20 is carried by a leg 21 that is pivotally mounted on a frame member 22 of the aircraft by a suitable bracket 23. A link 25 extending diagonally upward from the leg 21 is pivotally connected by a pivot pin 26 to a second link 27, and the second link is in turn anchored to the aircraft structure by a fixed pivot pin 28. The leg 21 is swung between the retracted position shown in full lines and the extended position shown on dotted lines, which positions may be referred to as the alternate positions of a driven member, the driven member being the leg 21. The movements between the two limit positions are actuated through an extensible arm generally designated 30 that is free to swing about the axis of a countershaft 31, the extensible arm including a tubular section 32 and a screw section 33 threaded into the tubular section. The screw section 33 is rotated by the countershaft 31 through suitable bevel gears that do not appear in the drawings. A motor generally designated 35 for actuating the landing gear of the aircraft has a motor shaft 36 extending in opposite directions from the motor to operate the countershaft 31 on one side of the aircraft and a corresponding countershaft (not shown) on the other side of the aircraft, the operative connection between the drive shaft and each of the counter shafts being provided by suitable bevel gears 37.

In the type of control arrangement to which the present invention pertains, a limit switch is provided for response to the driven member to deenergize the actuating motor as the driven member approaches a limit position, and in the instant control arrangement two such limit switches are employed. In Fig. 1 a limit switch generally designated 40 is mechanically opened as the landing gear reaches retracted disposition and a second limit switch generally designated 41 is adapted to open as the landing gear approaches fully extended disposition for landing. Any suitable arrangement may be devised to make the limit switches responsive to the landing gear mechanism. In the present construction I provide a special switch-control member 42 with two switch-operating pins 43 and 45 and provide for driving the switch control member synchronously with the land gear. The means for actuating the switch control member 42 synchronously with the landing mechanism may include a worm 47 at the switch control member, a countershaft 48 for driving the worm 47, and a worm gear 50 on the motor shaft 36 meshing with a second worm (not shown) on the countershaft 48.

Instead of placing such limit switches directly in the energizing circuit of the motor 35, I prefer to arrange the two limit switches in auxiliary or control circuits that govern the motor circuit through relays. In Fig. 1 a master switch generally designated 51 for the control circuits is movable between alternate positions representing the alternate dispositions of the landing gear and is operated by a control member (not shown) within reach of the aircraft pilot, the pilot shifting the control member from one alternate position to the other whenever he desires to change the disposition of the landing gear.

The control circuit that is broken by the limit switch 40 to stop the retraction movement of the landing gear may be traced as follows: battery 52, wire 53, switch arm 55 and contact 56 of the master switch 51, wire 57, the coil of a relay 58, wire 60, limit switch 40, wire 61 to ground, and wire 62 from ground to the second terminal of the battery 52. The other control circuit, which is broken by the limit switch 41 to stop the extension operation of the landing gear, may be traced as follows: battery 52, wire 53, switch arm 55 and contact 65 of the master switch 51, wire 66, the coil of a relay 67, wire 68, limit switch 41, wire 70 to ground and wire 62 from ground to the other side of the battery 52.

When the relay 58 is energized and thereby moves a pair of normally open contact arms 71 and 72 to closed positions, a motor circuit to operate the motor 35 in one rotary direction is established as follows: motor battery 73, wire 75, contact arm 71, wire 76, wire 77, fields coils 78 of the motor 35, wire 80, contact arm 72, wire 81, armature contact 82, armature coils of the motor (not shown), armature contact 83, and wire 85 to the second terminal of the motor battery 73. When the relay 67 is energized to move a pair of normally open contact arms 86 and 87 to closed positions, the motor is driven in the opposite rotary direction by virtue of the following circuit: motor battery 73, wire 75, contact arm 86, wire 88, wire 80, field coil 78, wire 77, contact arm 87, wire 81, the armature coils of the motor, and wire 85 to the second terminal of the motor battery 73.

The manner in which the various circuits are functionally interrelated will be readily recognized. Fig. 1 shows the various parts as disposed when the landing gear is fully retracted, the switch arm 55 of the master switch 51 then being swung to the contact 56 representing the retracted disposition of the landing gear. If the pilot desires to extend the landing gear, he merely causes the switch arm 55 of the master switch 51 to be swung to the alternate position against the contact 65 which results in energization of the relay 67, since the relay switch 41 in the corresponding control circuit is closed. Energization of the relay 67 moves the contact arms 86 and 87 from their normally open positions to closed positions, and the motor is thereby energized to lower the landing gear and continues to be energized until the limit switch 41 opens in response to the approach of the landing gear to the limit of its extension. Subsequent retraction of the landing gear is accomplished by returning the switch arm 55 of the master switch 51 to the position against the contact 56 whereupon the relay 58 is energized since the limit switch 40 is automatically closed when the landing gear is extended.

In the described landing gear, it is apparent that each of the legs 21 is swung upward into retracted position against gravity and that gravity tends to cause the landing gear to creep out of fully retracted disposition. One of the objects of the present invention is to prevent the motor 35 from being energized frequently, and this object is attained by designing at least the limit switch 40 for delayed action in its closing movement. Preferably both of the limit switches 40 and 41 are of the same construction, both operating with snap action as well as delayed action in their opening and closing movement. My preferred construction for such limit switches is shown in specific detail in Figs. 2 to 9, which construction will now be described.

Figs. 2 and 3 show a casing 90 having a compartment 91 for the switch-control member 42, a compartment 92 for the limit switches 40 and 41, and other compartments that need not be described provided to house the coils and contact arms of the two relays 58 and 67.

The previously mentioned worm 47, which is driven by the countershaft 48, is journaled in a pair of bearings 93 in the compartment 91 and meshes with a worm gear 95 keyed to a stub shaft 96. The stub shaft 96 is journaled in a suitable bearing 97 in the compartment 91 and carries the previously mentioned rotary switch-control member 42, which member is in the form of a disc attached to the stub shaft by a cross pin 98.

The rotary switch-control member 42 has an arcuate groove 100 formed with overhanging sides to slidingly engage the heads 101 of two screws 102, and the arcuate groove is cut away as indicated at 103 for admitting the heads of the screws. The previously mentioned switch operating pins 43 and 45 are tubular members that thread onto the screws 102 for pressure against the face of the switch control member 42 and may be provided with slots 105 in their ends for engagement by a screwdriver whenever it is desirable to change the positions of the switch operating pins along the arcuate groove 100.

In the preferred form of my invention the structures of the two limit switches 40 and 41 are identical. The principal parts of the limit switch 40 are a switch arm 106, a first movable or rotary means 107 for direct operation of the switch arm, and a second movable or rotary means 108 for operating the first means with delayed action in response to movements of the rotary switch control member 42.

The switch arm 106 is in the form of a leaf spring carrying a movable contact 110 which the leaf spring tends to hold against a cooperative stationary contact 111. The switch arm 106 is carried by a small metal bracket 112 that is electrically connected to the grounded wire 61 of the previously described wiring diagram. The stationary contact 111 is mounted on a small metal bracket 113 that is electrically connected with the previously mentioned wire 60 of the wiring diagram. The various parts of the two limit switches 40 and 41, including the metal brackets 112 and 113, are mounted on an insulating base plate 115 that forms a wall of the compartment 92.

The first rotary member 107 may be in the form of a metal plate mounted on a flanged pivot member 116, the plate being cut to form a stop shoulder 117 (Fig. 8) and a stop shoulder 118 (Fig. 7) and being bent to form an arcuate flange 120 and a latch flange 121. In the closed-circuit position of the rotary member 107 the flexible switch arm 106 is permitted to hold the movable contact 110 against the stationary contact 111 as shown in Fig. 3, but in the open-circuit position of the rotary member 107 the arcuate flange 120 flexes the switch arm 106 to separate the contacts 110 and 111.

The function of the second rotary member 108 is to transmit actuating force to the first rotary member 107 in a yielding manner in response to the switch-control member 42, but to block the movement of the first rotary member 107 for a substantial delay period during initial stages of both circuit-closing and circuit-opening switch operations. In my preferred construction the second rotary member 108 comprises a switch finger 122 for cooperation with the rotary switch control member 42 and, unitary with the finger, a latch arm 123 that is bent towards the first rotary member 107 to form a latch finger 125 for cooperation with the latch flange 121. The switch finger 122, which carries the latch arm 123, is pivotally mounted on a suitable stud 126 mounted on the base plate 115 and held thereon by a removable plate 127, the removable plate 127 being common to both limit switches 40 and 41.

The circuit-closing position of the second rotary member 108 is determined by a stop shoulder 128 presented by an angular plate 129, and the rotary member is continuously urged towards it circuit-closing position by a relatively heavy laminated spring 130 that is anchored at one end by screws 131 (Figs. 2 and 4) to the base of the switch finger 122 and is suitably restrained at the other end. In the particular construction shown, I interconnect the outer end of the laminated spring 130 of the limit switch 40 and the outer end of the corresponding laminated spring 130ª of the limit switch 41, for example by a machine screw 132, so that the resistance to flexure of one of the laminated springs is reinforced by the resistance of the other.

To provide the required yielding connection for transmitting actuating force from the second rotary member 108 to the first rotary member 107, I may employ a leaf spring 133 adjacent the laminated spring 130 on the base of the switch finger 122 disposed to press against the arcuate flange 120, and I may mount a double leaf spring 134 on the other side of the switch finger base to engage the rotary member 107 in a slot 135 cut in the arcuate flange 120. When the second rotary member 108 is in the circuit-closing position shown in Fig. 3, the double leaf spring 134 urges the first rotary member 107 clockwise towards a circuit-closing position determined by abutment of the previously mentioned stop shoulder 117 of the first rotary member against a stop block 136. The stop block 136 is common to both limiting switches 40 and 41. When the second rotary member 108 is in its circuit-opening position, the leaf spring 133 as well as the double leaf spring 134 tends to rotate the first rotary member 107 counter-clockwise, the tendency being to swing the stop shoulder 118 of the first rotary member against the stop block 136.

The movements of the first rotary member 107 in either direction to follow corresponding movements of the second rotary member 108 are delayed by temporary engagements of the latch finger 125 with the latch flange 121, as will be readily understood from the following sequence of operations.

Let it be assumed that in Fig. 3 the switch control member 42 is being rotated clockwise as the motor 35 is retracting the landing gear of the aircraft. It will be noted that all the movable parts of both the limit switches 40 and 41 are in circuit-closing positions. Eventually the switch-operating pin 43 moves into contact with the switch finger 122 and thereby rotates the second rotary member 108, but the resultant flexure of the springs 130, 133, and 134 does not cause corresponding rotation of the first rotary member 107 because, as indicated in Fig. 7, the latch finger 125 moves into the path of the latch flange 121 before the springs are flexed to an effective degree. The first stage of the circuit-opening operation of the limit switch terminates when the latch finger 125 swings clear of the latch flange 121, permitting the latch flange to escape, whereupon the first rotary member 107 moves to the circuit-closing position shown in Fig. 7 at which position the flexible switch arm 106 is deflected to separate the contacts 110 and 111.

With the various parts disposed as shown in Fig. 7, let it be assumed that the pilot causes the master switch 51 to be swung to a position for energizing the motor 35 in the opposite direction to lower the landing gear. Immediately the synchronized switch-operating member 42 will rotate counter-clockwise to cause the switch operating pin 43 to retreat from the limit position of Fig. 7. During the first stage of the circuit-closing operation of the limit switch 40, the relatively heavy laminated springs 130 and 130ª cooperate to rotate the second rotary member 108 towards circuit-closing position, the switch finger 122 being caused to follow the retreating movement of the pin 43. The clockwise rotation of the second rotary member 108 towards circuit-closing position causes the double leaf spring 133 to flex and press the first rotary member 107 towards circuit-closing position, but the tendency of the first rotary member to follow the rotation of the second rotary member is prevented by movement of the latch finger 125 into the path of the latch flange 121 before the flexure of the double leaf spring becomes effective. Fig. 9 shows the latch finger 125 acting as a temporary stop for the latch flange 121, and it will be noted that engagement of the latch finger with the latch flange is opposite from the engagement shown in Fig. 7. The first stage of the circuit-closing operation of the limit switch terminates when the latch finger 125 is swung far enough clockwise to release the latch flange 121 whereupon the double leaf spring 134 rotates the first latch member 107 to the circuit-closing position shown in Fig. 3.

From a comparison of the limit position of the switch-operating pin 43 shown in Fig. 7 with the subsequent position of the pin near the end of the first stage of circuit-closing operation indicated in Fig. 9, it is apparent that substantial creepage of the landing gear from its extreme retracted disposition may occur without causing energization of the motor circuit to maintain the retracted disposition of the landing gear. As a result of the described arrangement, the landing gear is effectively maintained in retracted disposition with only infrequent motor operation.

Since the second limit switch 41 is closely similar to the first limit switch 40, as indicated by corresponding numbers designating corresponding parts in the drawings, it is not necessary to give any further detailed description. It will be apparent that the pin 45 cooperates with the switch finger 122ª in the same manner that the pin 43 cooperates with the switch finger 122, the movement of the pin 45 towards the switch finger 122ª causing the limit switch 41 to open and the opposite movement of the pin 45 causing the limit switch 41 to close.

My detailed and specific description of the preferred form of my invention for a specific use will suggest to those skilled in the art various changes and substitutions in applying the underlying concept, and I reserve the right to all such changes and substitutions that properly come within the scope of my appended claims.

I claim as my invention:

1. A limit switch of the character set forth for controlling an electrically-actuated member at a limit position of the member, said switch comprising: a pair of switch contacts; a first means operatively connected with said pair of contacts, said means being movable in one direction to cause said contacts to separate and in the opposite direction to cause the contacts to close together; a second means movable between a circuit-closing position and circuit-opening position, said second means being mechanically responsive to said electrically-actuated member to move to circuit-opening position when said member approaches said limit position and to move to circuit-closing position as said member initially retreats from said limit position; means yieldingly connecting said second means with said first means to cause said first means to tend to follow the movements of the second means in both directions; and means operatively connected with said second means to delay movement of said first means during initial movement of the second means in both directions.

2. A limit switch of the character set forth for controlling an electrically-controlled member at a limit position of the member, said switch comprising: a pair of switch contacts; a rotary means movable in one direction about its axis to cause said contacts to separate and movable in the other direction to cause said contacts to close together; a second rotary means movable about a second axis between a circuit-closing position and a circuit-opening position, said second rotary means being mechanically responsive to said electrically controlled member to move to circuit-opening position when said member approaches said limit position and to move to circuit-closing position as said member initially retreats from said limit position; means responsive to said second rotary means to yieldingly urge said first rotary means to follow the movements of said second rotary means; a first latch means positioned on said first rotary means to be carried thereby in an arcuate path; and a second latch means positioned on said second rotary means to be carried thereby in an arcuate path across the arcuate path of said first latch means, said second latch means being disposed and dimensioned to temporarily intercept and block said first latch means to delay the movements of said first rotary means in both rotary directions.

3. A combination as set forth in claim 2 in which said first rotary means is in a first plane of rotation and said second rotary means is in a second plane of rotation spaced from the first plane, said first latch means projecting from the first rotary means towards said second plane, and said second latch means projecting from said second rotary means towards said first plane.

4. Means for controlling a circuit at a limit position of a member controlled by the circuit, said means comprising: a switch in said circuit; a switch operating member movable from a first position to a second position to open said switch and from said second position to said first position to close the switch, said operating member being movable to said second position in response to approach of said controlled member to said limit position; yielding means operatively connecting said operating member with said switch for actuation of the switch; means operatively connected with said operating member to prevent actuation of the switch in opposition to said yielding means during initial movement of the operating member from said first position to said second position and during initial movement of the operating member from said second position to said first position; and yielding means continuously urging said operating member toward said first position to cause said operating member to move to said first position automatically whenever said controlled member departs from said limit position.

5. A limit switch of the character set forth for controlling an electrically-controlled member at a limit position of the member, said switch comprising: a pair of switch contacts; a rotary means movable in one direction about its axis to cause said contacts to separate and movable in the other direction to cause said contacts to close together; a second rotary means movable about a second axis between a circuit-closing position and a circuit-opening position, said second rotary means being mechanically responsive to said electrically-controlled member to move to circuit-opening position whenever said member approaches said limit position; means responsive to said second rotary means to yieldingly urge said first rotary means to follow the movements of said second rotary means; a first latch means positioned on said first rotary means to be carried thereby in an arcuate path in opposite directions; a second latch means positioned on said second rotary means to be carried thereby in opposite directions in an arcuate path across the arcuate path of said first latch means, said second latch means being disposed and dimensioned to intercept and block said first latch means during initial movement of said second rotary means from said second circuit-closing position and during initial movement of said second rotary means from said circuit-opening position thereby to relay responsive movements of said first rotary means in both directions; and yielding means urging said second rotary means to circuit-closing position to cause the second rotary means to move to said circuit-closing position whenever said electrically-controlled member initially retreats from said limit position.

6. A combination as set forth in claim 5 in which said first rotary means is in a first plane of rotation, said second rotary means is in a second plane of rotation spaced from the first plane, said first latch means projects from the first rotary means toward said second plane, and said second latch means projects from said second rotary means toward said first plane.

7. A limit switch of the character set forth for controlling an electrically-controlled member at a limit position of the member, said switch comprising: a pair of switch contacts; a movable member operatively connected with said pair of contacts, said movable member being movable in one direction to cause said contacts to separate and in the opposite direction to cause the contacts to close together, said movable member having a first face disposed toward one of its directions of movement and a second face disposed toward its other direction of movement; a switch-operating member movable between a circuit-closing position and a circuit-opening position, said switch-operating member being responsive to movement of said electrically-controlled member to and from said limit position; and yielding means operatively connecting said switch-operating member with said movable member to actuate the movable member, said switch-operating member having a first retarding face position to extend across the path of said first face of the movable member during initial movement of the switch-operating member in one direction, said switch-operating member having a second retarding face positioned to extend across the path of the second face of the movable member during initial movement of the operating member in the opposite direction.

8. A limit switch of the character set forth for controlling an electrically-controlled member at a limit position of the member, said switch comprising: a pair of switch contacts; a first rotary means movable in one direction about an axis to cause said contacts to separate and movable in the other direction to cause said contacts to close together; a second rotary means movable about a second axis between a circuit-closing position and a circuit-opening position, said second rotary means being mechanically responsive to said electrically-controlled member to move to circuit-opening position whenever said member approaches said limit position and to move to circuit-closing position as said member initially retreats from said limit position; yielding means interconnecting said two rotary means to be stressed by said second rotary means in one direction to cause said first rotary means to move in one direction and to be stressed by said second rotary means in the opposite direction to cause said first rotary means to move in the opposite direction; a latch means on said first rotary means directed toward said second rotary means; and a latch means on said second rotary means directed toward said first rotary means, said two latch means being positioned to follow intersecting paths, said second latch means having one face positioned to block said first latch means during initial movement of said second rotary means in one direction, said second latch means having a second face positioned to block said first latch means during initial movement of said second member in the opposite direction.

JAMES H. CANNON.